(12) United States Patent
König et al.

(10) Patent No.: US 12,738,103 B2
(45) Date of Patent: Sep. 15, 2026

(54) METHOD FOR CARRYING OUT A FUNCTIONAL DIAGNOSIS OF AT LEAST ONE VEHICLE COMPONENT, AND DIAGNOSTIC SYSTEM

(71) Applicant: MERCEDES-BENZ GROUP AG, Stuttgart (DE)

(72) Inventors: Simone König, Ellwangen (DE); Oliver Kopp, Sindelfingen (DE); Michael Hahn, Ostfildern (DE); Rose Sturm, Gaertringen (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 43 days.

(21) Appl. No.: 18/856,311

(22) PCT Filed: Mar. 23, 2023

(86) PCT No.: PCT/EP2023/057400
§ 371 (c)(1),
(2) Date: Oct. 11, 2024

(87) PCT Pub. No.: WO2023/198421
PCT Pub. Date: Oct. 19, 2023

(65) Prior Publication Data

US 2025/0252787 A1 Aug. 7, 2025

(30) Foreign Application Priority Data

Apr. 12, 2022 (DE) ..................... 10 2022 001 254.5

(51) Int. Cl.
*G07C 5/00* (2006.01)
*G05B 15/02* (2006.01)

(52) U.S. Cl.
CPC ............ *G07C 5/008* (2013.01); *G05B 15/02* (2013.01)

(58) Field of Classification Search
CPC .. G07C 5/008; G07C 5/0808; G07C 2205/02; G07C 5/006; G07C 5/0816; G07C 5/08;
(Continued)

(56) References Cited

U.S. PATENT DOCUMENTS 6,401,049 B1 6/2002 Ehmer
9,538,362 B2 1/2017 Allmann et al.
(Continued)

FOREIGN PATENT DOCUMENTS

DE 102009033806 A1 1/2011
DE 102012110623 A1 5/2014
(Continued)

OTHER PUBLICATIONS

Office Action dated Jul. 8, 2025 in related/corresponding EP Application No. 23714670.9.
(Continued)

*Primary Examiner* — Bao Long T Nguyen
(74) *Attorney, Agent, or Firm* — PATENT PORTFOLIO BUILDERS PLLC

(57) ABSTRACT

Functional diagnosis of a vehicle component of a vehicle in production involves a vehicle-external first computing unit generating a diagnosis execution protocol. The diagnosis execution protocol includes machine-readable instructions for performing an at least semi-automated functional diagnosis of vehicle components by an in-vehicle computing unit. The diagnosis execution protocol is transferred to the in-vehicle computing unit of the vehicle in production. The diagnosis execution protocol is executed by the in-vehicle computing unit. The in-vehicle computing unit controls a vehicle component to check for correct functioning of the vehicle component. The response behavior of the vehicle component is captured automatedly by the in-vehicle computing unit or with manual assistance by a person supervis-
(Continued)

ing the production of the vehicle. The captured response behavior is output to the first computing unit external to the vehicle or a second computing unit external to the vehicle.

9 Claims, 3 Drawing Sheets

(58) Field of Classification Search
CPC ....... G05B 15/02; B60L 2270/40; B60L 3/12; G01M 17/007
See application file for complete search history.

(56) References Cited

U.S. PATENT DOCUMENTS

| | | | | |
|---|---|---|---|---|
| 2002/0133273 | A1 | 9/2002 | Lowrey et al. | |
| 2004/0167689 | A1 * | 8/2004 | Bromley | G07C 5/008 701/29.6 |
| 2009/0276115 | A1 * | 11/2009 | Chen | G07C 5/0808 701/29.6 |
| 2011/0015887 | A1 | 1/2011 | Horst et al. | |

FOREIGN PATENT DOCUMENTS

| | | | |
|---|---|---|---|
| DE | 102013014878 | B3 | 10/2014 |
| DE | 102015012524 | A1 | 5/2016 |
| DE | 102018203067 | A1 | 9/2019 |
| DE | 102022001254 | B4 | 10/2023 |
| EP | 0793086 | A2 | 9/1997 |
| JP | 2001506021 | A | 5/2001 |
| JP | 2004165919 | A | 6/2004 |

OTHER PUBLICATIONS

International Search Report and Written Opinion dated Jul. 5, 2023 in related/corresponding International Application No. PCT/EP2023/057400.

Office Action created Aug. 25, 2022 in related/corresponding DE Application No. 10 2022 001 254.5.

Office Action dated Oct. 28, 2025 in related/corresponding JP Application No. 2024-559963.

* cited by examiner

5
RE_1
2
3
bpmn.xml
RKOM
101
102
6
2
RI
1
RI
1
RI
1
RI
1

3
RE_1
RE_1
3
6
RKOM
6
7
RE_2_central
4
6
RE_2
RE_2
RI
RE_2_Tab
1

METHOD FOR CARRYING OUT A FUNCTIONAL DIAGNOSIS OF AT LEAST ONE VEHICLE COMPONENT, AND DIAGNOSTIC SYSTEM

BACKGROUND AND SUMMARY OF THE INVENTION

Exemplary embodiments of the invention relate to a method for carrying out a functional diagnosis of at least one vehicle component of a vehicle in production and to a diagnostic system for carrying out the method.

Complex machines such as vehicles require a plurality of individual working steps during assembly to reach completion. Individual assembly steps might have been carried out incorrectly and/or faulty components might have been installed. This requires relevant vehicle functions to be checked to ensure that they are functioning correctly before the vehicle is delivered. If errors occur, then measures can be introduced to rectify the errors before the vehicle is delivered.

For example, a vehicle is checked before delivery to see whether the right software, in particular its most up-to-date version, is installed on the respective computers or control devices installed in the vehicle. In addition, the sensors installed in the vehicle are calibrated. Monitoring the vehicle can involve individual functional checking steps being carried out manually, partially assisted, or completely automatically by a computer. For this purpose, a corresponding computer system is typically connected to a computer of the vehicle via a cable by means of a so-called on-board diagnostics connector. The vehicle-external computer system then controls the corresponding vehicle components to be checked or calibrated.

The planning, preparation, and implementation of such a functional check is associated with significant costs. The process steps to be carried out in the vehicle diagnostics first need to be specified and documented. The corresponding process steps must then be converted into program code, which must then be loaded onto the computer system. The program code must then be run. During this process of transferring the planning steps into a program code used to control the vehicle components, so-called media disruptions occur, whereby errors can arise. For example, a process step can be misunderstood by a programmer, whereupon an incorrect instruction is integrated into the program code. In addition, the computer systems of the vehicle differ from the development systems, which can lead to a higher instance of bugs. A diagnostic program can thus function flawlessly in a testing environment, but run incorrectly when executed in the vehicle.

DE 10 2009 033 806 A1 discloses a method for producing and testing the functionality during production. The method describes centralized management of the implementation of the functional testing of a vehicle in production or of vehicle components by a central computer. It is necessary to carry out different functional tests for different model types at different production and/or test stations. The respective relevant method steps and corresponding program code for the different model types and production and/or test stations are stored on the central computer. The test data gathered during the test is also centrally collected and evaluated, which allows potentially occurring errors to be assigned quickly and directly to a corresponding source of error. In addition, this makes it easier to introduce countermeasures to rectify a corresponding error.

The servicing of motor vehicle control devices via mobile communications is known from DE 10 2013 014 878 B3. The method provides that a communication link based on mobile communications is formed between a vehicle-external computer and a vehicle-internal control device, wherein device data is exchanged between the computer and the control device via the communication link. The device data is configuration data for the control device, error messages of the control device, and/or status messages of the control device. The vehicle-external computer functions as a central administrator for carrying out the vehicle diagnostics. The computer can thus transmit a command to a respective control device, said command causing the control device to carry out a self-test defined according to a predetermined routine implemented in the respective control device.

DE 10 2012 110 623 A1 furthermore discloses a measuring device for carrying out measuring and testing tasks in processes that can be predetermined. The measuring device is equipped to read a file containing a process description. The measuring device converts the process description into a program process routine, and carries out the latter. The file can be created with an editor for Business Process Model and Notation.

In addition, a method and a production plant for producing a motor vehicle are known from DE 10 2018 203 067 A1. The method provides that a speech input is recorded by a vehicle-internal control device and a corresponding meaning is assigned to the speech input. A dataset corresponding to the meaning is then transmitted to the testing device for evaluation via an interface between the control device and the vehicle-external testing device.

Exemplary embodiments of the present invention are directed to an improved method for carrying out a functional diagnosis of at least one vehicle component of a vehicle in production, said method guaranteeing an efficient and reliable implementation of the functional diagnosis.

A method according to the invention for carrying out a functional diagnosis of at least one vehicle component of a vehicle in production differs from a conventional method by the following method steps:

- generating a diagnosis implementation protocol by means of a first vehicle-external computer, wherein the diagnosis implementation protocol comprises machine-readable instructions for carrying out an at least partially automated functional diagnosis of vehicle components via a vehicle-internal computer;
- transmitting the diagnosis implementation protocol to the vehicle-internal computer of the vehicle in production;
- implementing the diagnosis implementation protocol via the vehicle-internal computer, wherein the vehicle-internal computer controls at least one vehicle component to check that the at least one vehicle component is functioning correctly, and wherein the response of the at least one vehicle component is automatically recorded by the vehicle-internal computer or with manual assistance from a person supervising the production of the vehicle; and
- outputting the recorded response to the first vehicle-external computer and/or to a second vehicle-external computer.

The method according to the invention provides that the computer implementing the functional diagnosis is stored in the vehicle. In other words, the vehicle implements the functional diagnosis independently, which makes it possible to carry out the functional diagnosis particularly efficiently. The communication path of the controlling computer to the controlled components is thus shortened, which allows a particularly fast reaction time, and thus a reduction in latency. This makes it possible to implement time-sensitive calls efficiently. In addition, fewer CPU-intensive resources are required to carry out the functional diagnosis because a single centralized computer system no longer needs to simultaneously control a plurality of control devices to carry out the functional diagnoses of a plurality of vehicles.

The first vehicle-external computer can be understood as a developer system in this case. The machine-readable instructions are program code, which can be implemented by the vehicle-internal computer. The vehicle-internal computer itself is thus able to control the vehicle components to be checked in accordance with the diagnostic steps to be carried out. Corresponding diagnostic steps can be carried out and logged by the vehicle-internal computer in a completely automated manner, or with manual assistance from the person supervising the production of the vehicle. For example, it may be necessary for the person to manually manipulate the vehicle so that the functional test can be completely carried out and/or for the person to record and log the reaction caused by controlling the vehicle components. The person can then input a corresponding test result in the vehicle itself or via the first or second vehicle-external computer. The second vehicle-external computer can be a computer system used in production. For example, it can be a centralized production computer or an island system, for example a computer system provided on a production and/or test station.

If errors are discovered during the functional test, then the diagnosis implementation protocol can comprise corresponding instructions for reacting to errors, such as carrying out individual calibration or testing steps again and/or post-processing steps, which are then correspondingly implemented by the vehicle-internal computer. The corresponding instructions can be part of a combined diagnostic method or be implemented in addition to the latter as a "standard response" in reaction to typical errors. Individual diagnosis implementation protocols can thus also be generated for these standard responses and transmitted to the vehicle-internal computer for storage, said individual diagnosis implementation protocols then being implemented as required.

The instructions comprised by the diagnosis implementation protocol can be implemented in sequence and/or in parallel by the vehicle-internal computer. For example, the diagnosis to be carried out is sub-divided into "preparation", a "main section" and "post-processing". Examples of preparation can be: setting up a communication link between vehicle-internal and/or vehicle-external computers, carrying out an authentication or authorization, setting up a so-called "session", and the like. Examples of the main section can be: controlling actuators, reading sensor data, reading out an error log of a control device, adjusting calibration parameters, and the like. Examples of post-processing can be: ending a communication link, writing result data, publishing the result data to a vehicle-external system, resetting control device states, and the like.

An advantageous development of the method provides that the diagnosis implementation protocol is generated on the first vehicle-external computer using a graphical specification language, wherein the diagnosis implementation protocol comprises a process plan of the diagnostic steps to be carried out by the vehicle-internal computer, wherein the vehicle-external computer reads out the machine-readable instructions corresponding to the diagnostic steps from a vehicle-external database and integrates them into the diagnosis implementation protocol. The process for generating usable program code is thus efficiently structured on the vehicle-internal computer, from the pure idea, to the precise way in which a process step is to be carried out, to the generation of program code, to the final implementation and use by the vehicle-internal computer. In particular, media disruptions can thus be avoided, which significantly reduces the risk of errors. The process steps to be carried out in the functional diagnosis are thus formulated graphically in a user-friendly and easily understandable manner by means of the graphical specification language and converted directly into machine-readable instructions by the vehicle-external computer reading out the instructions appropriate for the respective diagnostic steps automatically from the vehicle-external database. The vehicle-external database can be understood as a so-called code repository. Required machine-readable instructions are implemented in the code repository for all steps that can possibly be implemented by a machine. Thus, manual programming effort is no longer required to integrate the machine-readable instructions that are needed to carry out a particular functional diagnosis into the vehicle-internal computer.

If new vehicles, vehicle components, and/or vehicle functions are developed by a vehicle manufacturer, then new machine-readable instructions can be written by a programmer into the vehicle-external database, i.e., the code repository, which also allows the functional diagnosis to be carried out reliably using the new components. If bugs occur, then corresponding existing machine-readable instructions of the vehicle-external database can be updated and edited.

The diagnosis implementation protocol thus denotes an umbrella term both for the purely theoretical process sequence of the testing steps to be carried out in a functional diagnosis and the program code used for this purpose to control vehicle components via the vehicle-internal computer.

The use of a graphical specification language leads, in particular, to a reduction in manual errors by the person overseeing production. Thus, the person can observe the testing steps to be carried out depicted graphically on any display device, for example on a tablet used in production and/or augmented reality glasses, and thus easily understand the work steps involved. The diagnosis implementation protocol can thus be easily interpreted both by the person and by a machine.

Corresponding to a further advantageous embodiment of the method according to the invention, Business Process Model and Notation (BPMN) is used as a graphical specification language. This is a graphical specification language used in business informatics and in process management. The time required to test different software variants can be reduced by the clear relationship between the process steps to be carried out and corresponding program code, which further improves efficiency when carrying out the functional diagnosis.

A further advantageous embodiment of the method further provides that the vehicle-internal computer is connected to a shared communication network with a vehicle-external computer via wires and/or wirelessly and the vehicle-internal computer exchanges information indirectly with the vehicle-external computer via a communication server. The vehicle-external computer can be the first or the second vehicle-external computer. For example, the vehicle-internal computer can be connected to the corresponding vehicle-external computer via an Ethernet cable or an on-board diagnostics cable. WLAN and/or mobile communications are preferably used for wireless communication, in particular using 5G or future mobile communication standards. In particular, the use of WLAN and/or mobile communications with at least the mobile communications standard 5G allows data transmission at comparatively high data transmission rates. In particular, if the vehicle-internal computer is simultaneously connected to the shared communication network with the vehicle-external computer both via wires and wirelessly, high data transmission rates can be achieved for different applications.

In general, it is also possible for the vehicle-external computer to communicate directly with the vehicle-internal computer. For example, the vehicle-external computer can be a tablet or desktop computer used by the person overseeing production, the computer being connected via wires or wirelessly to the vehicle-internal computer in a communicative manner. For example, the tablet of the person can set up an ad hoc WLAN that the vehicle-internal computer links up with. If, for example, unforeseen circumstances arise requiring the person to intervene manually, then the person can, for example, generate a new diagnosis implementation protocol on the tablet using the graphical specification language and transmit the new diagnosis implementation protocol directly to the vehicle-internal computer for use. This makes it possible to particularly quickly react to and adjust the process steps to be carried out in order to carry out the functional diagnosis. Such a procedure can also be used in the development of the machine-readable instructions to be saved in the vehicle-external database from the corresponding process steps integrated into the process plan.

Using the communication server, centralized access of the plurality of vehicle-internal computers to a central vehicle-external database is made possible even across different production locations. Thus, for example, a vehicle-external database can be integrated into the tablet integrated at the production and/or testing station. Thus, after the person has generated a corresponding process plan, the tablet can integrate corresponding machine-readable instructions into the diagnosis implementation protocol. Here, the risk arises of out-of-date machine-readable instructions being read out from the vehicle-external database inside the tablet. By accessing the central vehicle-external database via the communication server, corresponding distributed vehicle-external databases can be updated with updated program code.

A further advantageous embodiment of the method according to the invention further provides that the vehicle-internal computer controls a vehicle-external manipulation machine to carry out at least one diagnosis step and/or to introduce measures if the at least one vehicle component is not functioning correctly. Corresponding machine-readable instructions to control the vehicle-external manipulation machine are then also integrated into the diagnosis implementation protocol or into further diagnosis implementation protocols. The integration is preferably implemented in an automated manner depending on the process steps of the process plan defined in the graphical specification language. For example, the vehicle-external manipulation machine can be a robot provided at the production and/or testing station. The vehicle or a vehicle component can be manipulated in many ways; for example, the vehicle-external manipulation machine can move the vehicle or a vehicle component, check it using vehicle-external sensors, add new components or exchange or remove components that are already integrated, or the like. A post-processing of the vehicle or of vehicle components after the actual functional diagnosis has been carried out is thus possible. The method according to the invention thus makes it possible for the vehicle-internal computer to control machines used during production or during testing itself. A central computer for controlling the vehicle-external manipulation machines is then no longer necessary. This also ensures increased efficiency when carrying out the functional diagnosis. The vehicle-internal computer can control the vehicle-external manipulation machine directly, for example via a direct communication by means of WLAN or indirectly via a vehicle-external computer such as a central factory server.

According to the invention, in a diagnostic system with a first vehicle-external computer and with a vehicle in production, comprising a vehicle-internal computer, the first vehicle-external computer and the vehicle are equipped to carry out a method described above. The vehicle-internal computer is able to control and monitor all relevant vehicle components electrically or electronically. This makes it possible to carry out time-sensitive diagnostic process steps using particularly few resources with comparatively low latencies. An efficient functional diagnostic process is thus guaranteed.

An advantageous development of the diagnostic system provides at least one second vehicle-external computer, wherein the second vehicle-external computer is equipped to receive information from the vehicle-internal computer and/or to be controlled by the vehicle-internal computer. The vehicle-internal computer can, for example, transmit results of the functional diagnostic test to the second vehicle-external computer, the results being stored therein for evaluation. Measures for rectifying errors can also be initiated via the second vehicle-external computer depending on the evaluated results. The vehicle-internal computer can also control the second vehicle-external computer. For example. The second vehicle-external computer is the control device of a vehicle-external manipulation machine.

Preferably, the diagnostic system comprises a communication server, wherein the communication server is equipped to exchange information between the vehicle-internal computer and the first vehicle-external computer. This makes it possible to manage the vehicle-external database centrally. Thus, the engineers involved in planning the functional diagnosis do not need to be physically present in the factory to develop or implement new functional diagnosis processes. The corresponding newly generated diagnosis implementation protocols can be transmitted to the respective production and/or testing station during production via the communication server and can there be installed on the respective vehicle-internal computers. In general, it is also possible for the diagnosis implementation protocols to already be pre-installed on the vehicle-internal computer before the corresponding vehicle-internal computers are installed in the vehicle. This makes it possible to carry out particular functional diagnosis checks even without an existing communication link between the vehicle-external computer and the vehicle-internal computer. Corresponding diagnosis results can be temporarily stored on the vehicle-internal computer and be instantly transmitted to the first and/or second vehicle-external computer as soon as there is a communication link with them.

Further advantageous embodiments of the method according to the invention for carrying out the functional diagnosis of at least one vehicle component of a vehicle in production and of the diagnostic system result from the exemplary embodiments, which are described in more detail in the following with reference to the figures.

BRIEF DESCRIPTION OF THE DRAWING FIGURES

In the following:

DETAILED DESCRIPTION

The central idea of the method according to the invention for carrying out a vehicle diagnosis of at least one vehicle component of a vehicle 1 in production is independently carrying out the functional diagnosis via a vehicle-internal computer RI. Preferably, the complete process sequence is structured from the development of the process steps to be carried out in the functional diagnosis up to the generation of program code, implementation of the program code in the vehicle-internal computer RI, and executing the program code by using a graphical specification language, preferably in the form of Business Process Model and Notation (BPMN).

On a first vehicle-external computer RE_1, an engineer 5 creates a process plan of the diagnostic steps to be carried out by the vehicle-internal computer RI by means of the graphical specification language. A diagnosis implementation protocol 2 is created therefrom. The diagnosis implementation protocol 2 can be formulated in the graphical specification language, and then transformed into a meta-language, e.g., XML. The first vehicle-external computer RE_1 reads machine-readable instructions corresponding to the diagnostic steps from a vehicle-external database 3, also described as a code repository, and integrates them into the diagnosis implementation protocol 2. This takes place in method step 101. The vehicle-external database 3 can be stored on the first vehicle-external computer RE_1 and/or on a data storage device in a network, for example on a central server.

Figures 1, 2:
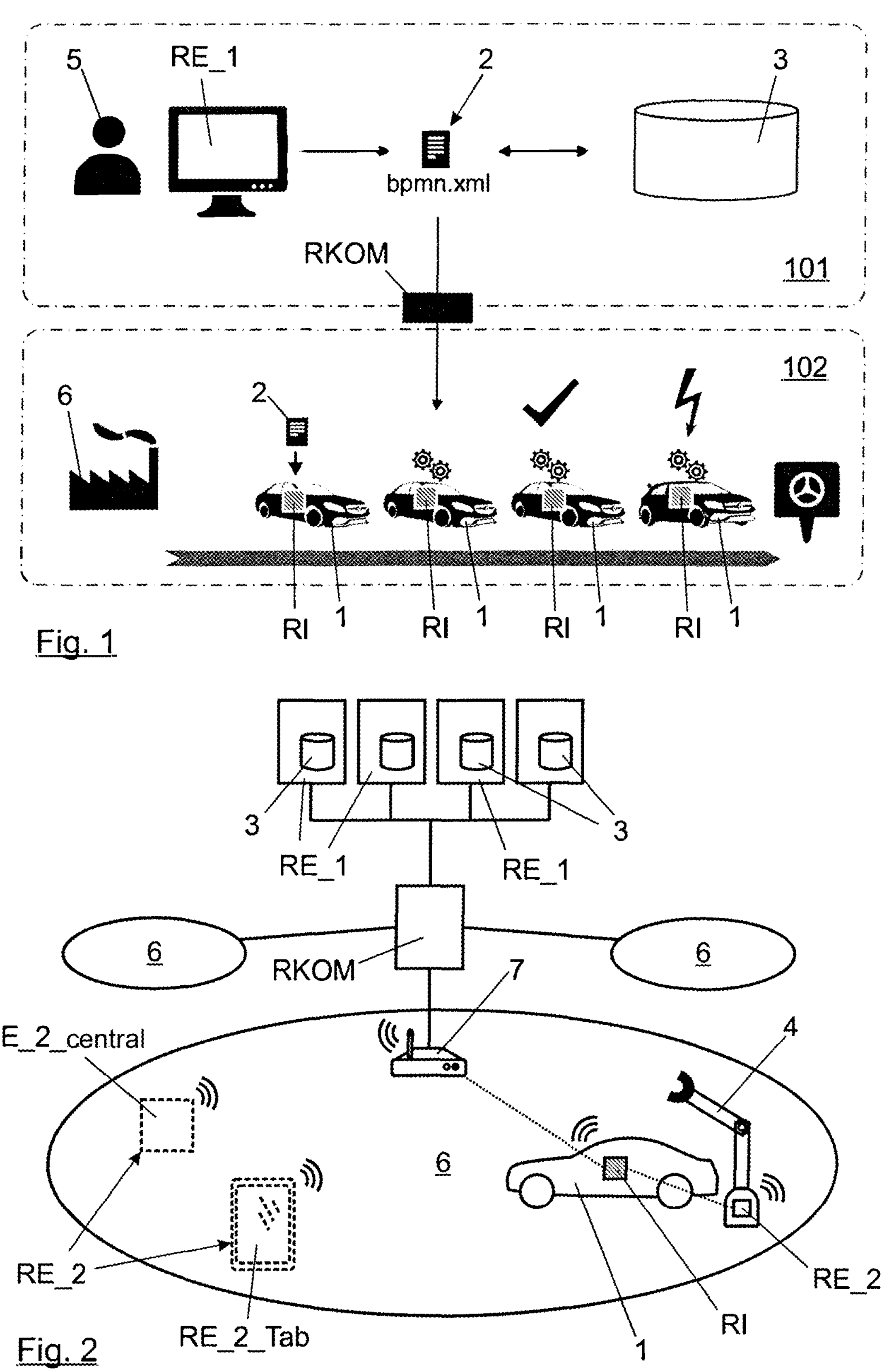
FIG. 1 shows a schematic depiction of the process sequence of a method according to the invention.
FIG. 2 shows a schematic depiction of the infrastructure used by a vehicle manufacturer to produce and develop vehicles, according to a first embodiment.

The diagnosis protocol 2 is transmitted via a communication server RKOM, for example a proxy server, to a factory 6 of the vehicle manufacturer in which the production is taking place. In the factory 6, the diagnosis implementation protocol 2 is distributed to the corresponding vehicle-internal computer RI of the vehicle 1 to be checked. In method step 102, the diagnosis implementation protocol 2 or the machine-readable instructions contained within are implemented by the vehicle-internal computer RI, whereby the vehicle-internal computer RI controls the at least one vehicle component to be checked and records the corresponding response in an automated manner or with manual assistance from a person supervising the production of the vehicle 1. If the functional diagnosis is successful, as indicated in FIG. 1 by a checkmark, then the vehicle 1 can be released for the next production step or for handover to the distributor. If, however, the functional diagnosis is unsuccessful, as indicated in FIG. 1 by a lightning bolt symbol, then further measures should be initiated. The further measures also described by instructions integrated into the diagnosis implementation protocol 2 can be carried out or initiated by the vehicle-internal computer RI.

FIGS. 2 and 3 serve once again to depict the infrastructure used by the vehicle manufacturer to produce and develop vehicles. In FIG. 2, several first vehicle-external computers RE_1 are depicted. Each of the first vehicle-external computers RE_1 comprises its own vehicle-external database 3. In this case, the first vehicle-external computers RE_1 can, for example, be the development PC of an engineer 5. A diagnosis implementation protocol 2 can be generated via such a PC and transmitted to a respective factory 6 via the communication server RKOM. In a respective factory 6, a communication relay 7, for example a WLAN router or a 5G modem, can be provided, via which the communication server RKOM is connected to the vehicle-internal computer RI in a shared communication network. A corresponding transmission of the diagnosis implementation protocol 2 to the vehicle-internal computer RI is depicted in FIG. 2 by a dotted line.

The vehicle-internal computer RI can also control a vehicle-external manipulation machine 4, for example a manipulation robot. The manipulation robot can thus move parts of the vehicle or manipulate them in another way. The vehicle-external manipulation machine 4 can also comprise one or more sensors for checking the state of the vehicle 1 or of vehicle components. Such a sensor can, for example, be a camera, a conductivity sensor, a temperature sensor, a force sensor, an ultrasound sensor or the like.

A control device of the vehicle-external manipulation machine 4 can be described as a second vehicle-external computer RE_2. Further second vehicle-external computers RE_2 can also be provided in the factory 6, e.g., a central factory server RE_2_Central. Results of a respective functional diagnosis generated by the vehicle-internal computers RI of vehicles 1 to be produced and/or checked can be stored and evaluated on the central factory sever RE_2_Central. Thus, on the one hand, the vehicle-internal computer RI or the central factory sever RE_2_Central can control corresponding vehicle-external manipulation machines 4 in order to initiate countermeasures in an automated manner in the event of an error in order to rectify the error. People can also be notified who can rectify an error manually.

A first vehicle-external computer RE_1 can also communicate directly with the vehicle-internal computer RI. A tablet computer RE_2_Tab is thus also depicted in an exemplary form, which can be used by a person supervising the production of the vehicle 1 to interact with the vehicle-internal computer RI. This allows for particularly short communication paths between the first vehicle-external computer RE_1 and the vehicle-internal computer RI.

Figure 3:
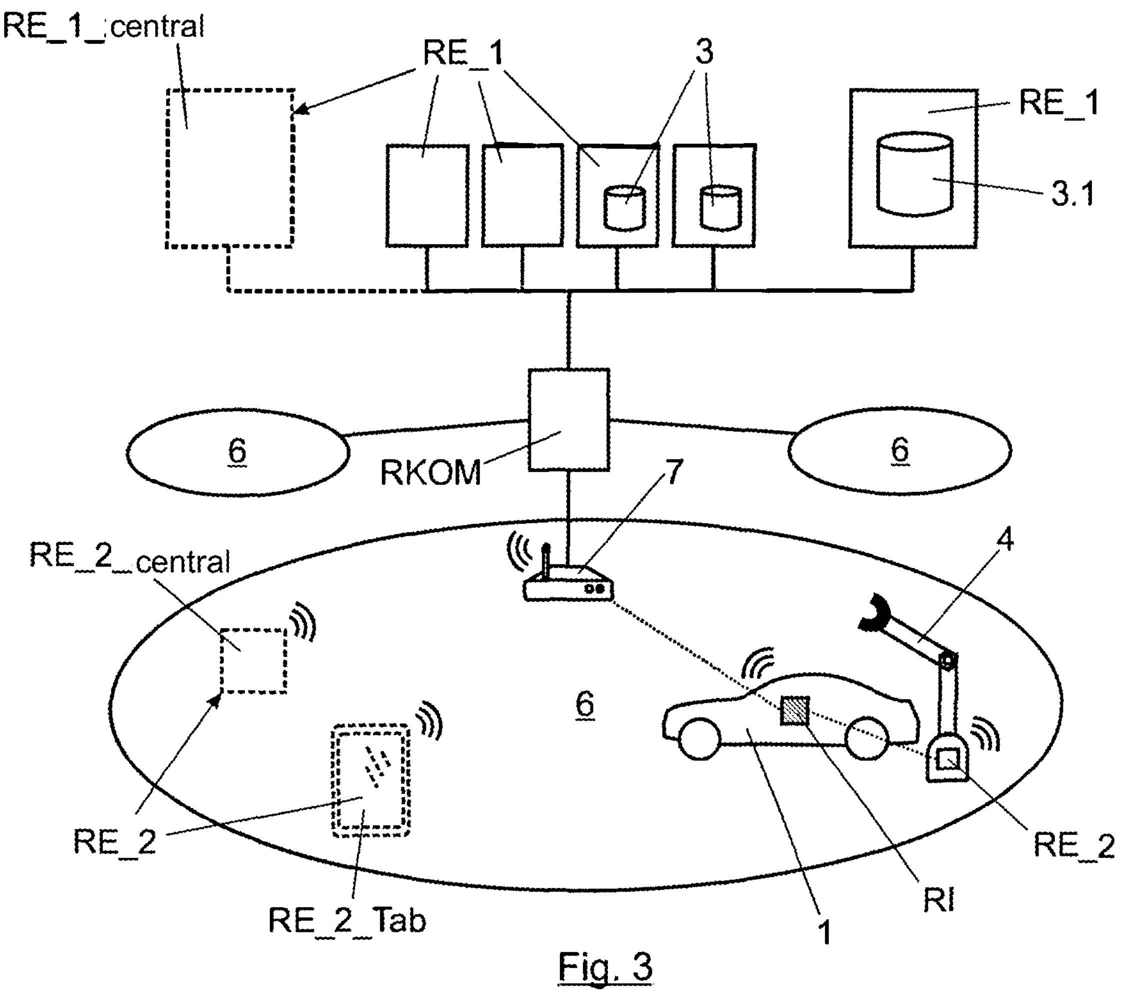
FIG. 3 shows a schematic depiction of the infrastructure used by a vehicle manufacturer to produce and develop vehicles, according to a second embodiment.

FIG. 3 shows a similar depiction to FIG. 2. A central vehicle-external database 3.1 and in some instances, indicated by a dashed line, a central server RE_1_Central are integrated into the computer network of the first vehicle-external computers RE_1. Developers can manage machine-readable instructions, i.e., code modules, stored in the central vehicle-external database 3.1. The corresponding first vehicle-external computers RE_1, e.g., developer PCs, can then update their respective vehicle-external database 3 by reading out the central vehicle-external database 3.1. Some of the developer PCs can also have no integrated vehicle-external database 3, and are dependent on a direct connection to the central vehicle-external database 3.1.

The entire method can also be managed by the central server RE_1_Central. For example, the results of the functional diagnoses transmitted from the vehicle-internal computers RI of the individual vehicles 1 can also be stored and evaluated. This makes it possible to analyze the data from production centrally. The advantages of de-centralized control of the implementation of the functional diagnosis and centralized evaluation of the corresponding results can thus be combined.

Systematic causes of error, which may, for example, indicate a faulty charge of individual components, can thus be determined particularly easily. Process steps can thus also be determined that are more susceptible to errors, for example because a sensor calibration takes too long.

Figure 4:
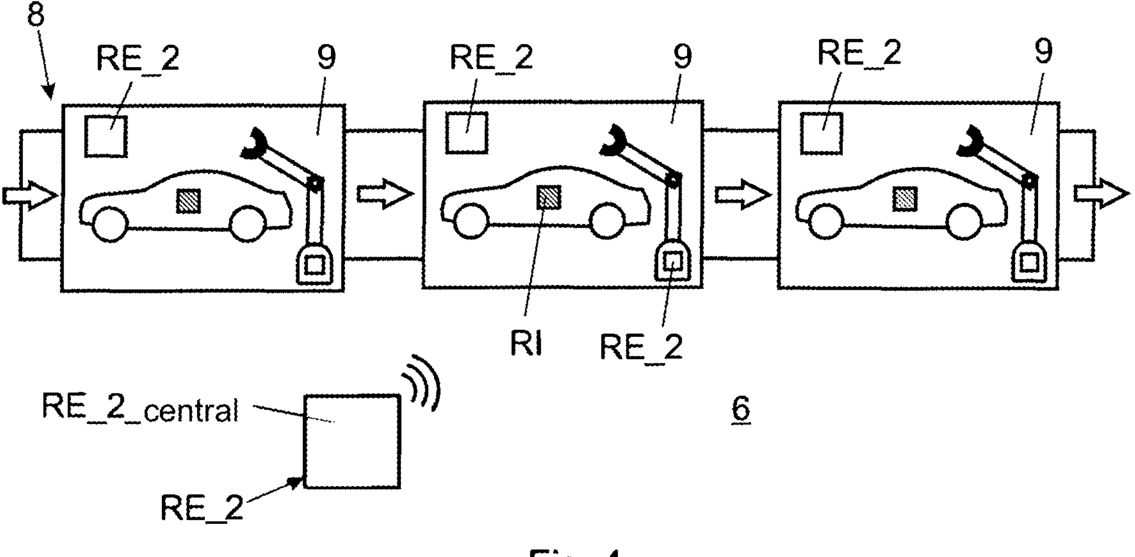
FIG. 4 shows a schematic depiction of a production line.

FIG. 4 shows the production and/or testing stations 9 arranged in series to form a production line 8. Individual production steps of a vehicle 1 or of a vehicle component can be carried out at a production and/or testing station 9, and/or a vehicle 1 or vehicle components can undergo a functional diagnosis. Each production and/or testing station 9 can have its own second vehicle-external computer RE_2, for example a central computer, which controls the machines used at the respective production and/or testing station 9. Each such machine, for example a vehicle-external manipulation machine 4, can also comprise its own control device in the form of a second vehicle-external computer RE_2.

Corresponding control commands can also be issued from the central factory server RE_2_Central and can be transmitted to the individual second vehicle-external computers RE_2 in the factory 6 in particular via WLAN, 5G or a future mobile communications standard. Data generated by the vehicle-internal computer RI depending on the functional diagnosis carried out can then correspondingly be transmitted back to the central factory server RE_2_Central for evaluation.

Figure 5:
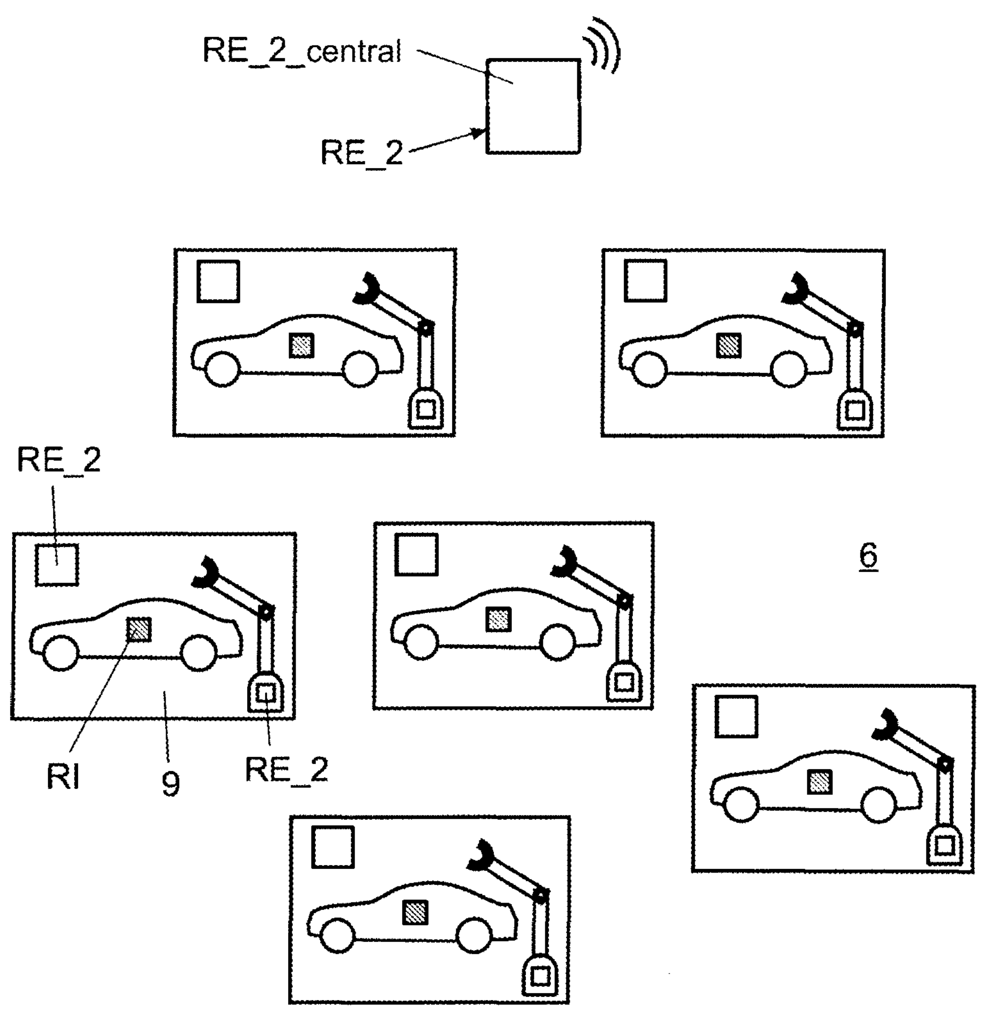
FIG. 5 shows a schematic depiction of a distributed production.

FIG. 5 shows an alternative or additional embodiment of the factory 6. Thus, individual or all production and/or testing stations 9 can be arranged such that they are spread out. This makes it possible to produce and/or test vehicles 1 particularly flexibly and efficiently, in accordance with the concept of industry 4.0. A vehicle 1 to be produced is thus not dependent on going through the individual production and/or testing stations 9 sequentially one after the other, and can instead remain assigned to a single production and/or testing station 9 for several production and/or testing steps and/or switch flexibly between them, whereby free capacity is used optimally with regard to efficiency.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for performing a functional diagnosis of at least one vehicle component of a vehicle that is in production, the method comprising:

generating, by a first computing unit external to the vehicle in production, a diagnosis execution protocol, wherein the diagnostic execution protocol comprises machine-readable instructions for performing an at least semi-automated functional diagnosis of vehicle components by an in-vehicle computing unit;

transmitting the diagnosis execution protocol to the in-vehicle computing unit of the vehicle in production;

executing, by the in-vehicle computing unit, the diagnosis execution protocol, to control the at least one vehicle component to check for correct functioning of the at least one vehicle component, and wherein a response behavior of the at least one vehicle component to the control by the in-vehicle computing unit is captured automatedly by the in-vehicle computing unit or with manual assistance by a person supervising the production of the vehicle; and outputting of the captured response behavior to the first computing unit external to the vehicle or to a second computing unit external to the vehicle.

2. The method of claim 1, wherein the in-vehicle computing unit is connected by wire or wirelessly to a common communication network with the first or second computing unit external to the vehicle and the in-vehicle computing unit exchanges information with the first or second computing unit external to the vehicle indirectly via a communication server.

3. The method of claim 2, wherein the wireless communication employs Wi-Fi or mobile radio protocols.

4. The method of claim 1, wherein the in-vehicle computing unit controls a manipulation machine external to the vehicle to perform at least one diagnostic step or to initiate measures if the correct functioning of the at least one vehicle component is disrupted.

5. A method for performing a functional diagnosis of at least one vehicle component of a vehicle that is in production, the method comprising:

generating, by a first computing unit external to the vehicle in production, a diagnosis execution protocol, wherein the diagnostic execution protocol comprises machine-readable instructions for performing an at least semi-automated functional diagnosis of vehicle components by an in-vehicle computing unit;

transmitting the diagnosis execution protocol to the in-vehicle computing unit of the vehicle in production;

executing, by the in-vehicle computing unit, the diagnosis execution protocol, wherein the in-vehicle computing unit controls the at least one vehicle component to check for correct functioning of the at least one vehicle component, and wherein a response behavior of the at least one vehicle component is captured automatedly by the in-vehicle computing unit or with manual assistance by a person supervising the production of the vehicle; and outputting of the captured response behavior to the first computing unit external to the vehicle or to a second computing unit external to the vehicle, wherein the diagnosis execution protocol is generated on the first computing unit external to the vehicle using a graphical language specification, wherein the diagnosis execution protocol comprises a schedule of the diagnostic steps to be performed by the in-vehicle computing unit, wherein the first computing unit external to the vehicle reads out machine-readable instructions corresponding to the diagnostic steps from a database external to the vehicle in production and integrates the read-out machine-readable instructions into the diagnosis execution protocol.

6. The method of claim 5, wherein the graphical language specification is a Business Process Model and Notation.

7. A diagnostic system comprising:

a vehicle in production having an in-vehicle computing unit; and a first computing unit external to the vehicle, wherein the first computing unit external to the vehicle is configured to generate a diagnosis execution protocol, wherein the diagnostic execution protocol comprises machine-readable instructions for performing an at least semi-automated functional diagnosis of vehicle components by an in-vehicle computing unit, the first computing unit external to the vehicle is configured to transmit the diagnosis execution protocol to the in-vehicle computing unit of the vehicle in production, the in-vehicle computing unit is configured to execute the diagnosis execution protocol to control the at least one vehicle component to check for correct functioning of the at least one vehicle component, and wherein a response behavior of the at least one vehicle component to the control by the in-vehicle computing unit is captured automatedly by the in-vehicle computing unit or with manual assistance by a person supervising the production of the vehicle, and the in-vehicle computing unit is configured to output the captured response behavior to the first computing unit external to the vehicle.

8. The diagnostic system of claim 7, further comprising:

at least one second computing unit external to the vehicle configured to receive or be controlled by information from the in-vehicle computing unit.

9. The diagnostic system of claim 7, further comprising:

a communication server configured to exchange information between the in-vehicle computing unit and the first computing unit external to the vehicle.

* * * * *